UNITED STATES PATENT OFFICE.

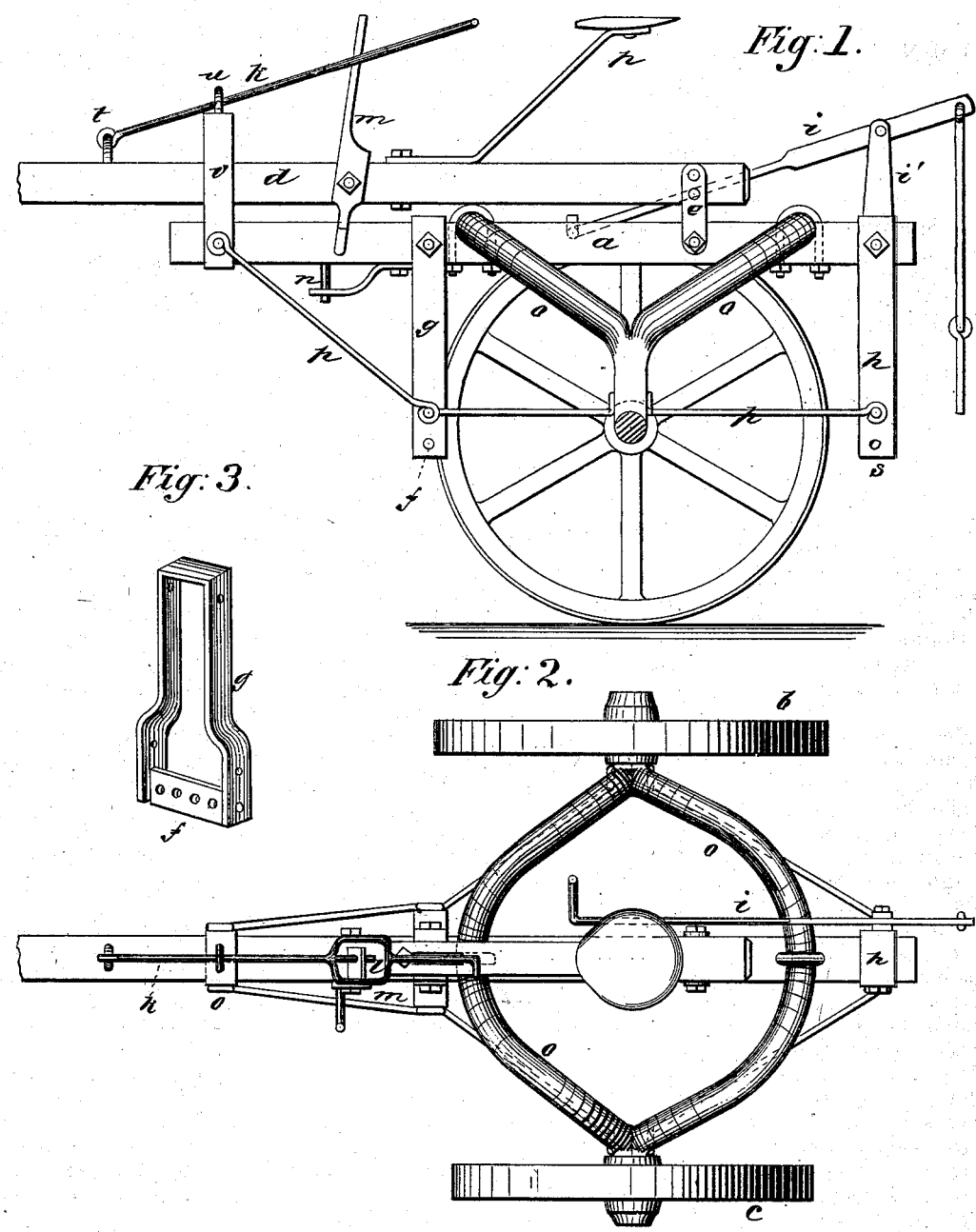

JOHN C. WELSH, OF STOKES STATION, ILLINOIS, ASSIGNOR TO HIMSELF AND WILSON M. WELSH, OF SAME PLACE.

IMPROVEMENT IN SULKY-PLOWS.

Specification forming part of Letters Patent No. 206,989, dated August 13, 1878; application filed June 4, 1878.

*To all whom it may concern:*

Be it known that I, JOHN C. WELSH, of Stokes Station, in the county of White and State of Illinois, have invented a new and Improved Sulky-Plow, of which the following is a specification:

The invention will first be described in connection with the drawing, and then pointed out in the claim.

In the accompanying drawing, Figure 1 is a side elevation, partially in section. Fig. 2 is a plan, and Fig. 3 is a perspective, view of the clevis in which the plow-beam is secured.

Similar letters of reference indicate corresponding parts.

$a$ is the main beam of the sulky. The wheels $b$ and $c$ are upon axles connected by the divided axle-tree $o$ $o$, which passes over the top of the beam $a$, and is secured firmly thereto. The larger wheel, $b$, is to run in the furrow, while the smaller wheel, $c$, is on the land-side. These wheels can be changed to either side, to suit a right or left hand plow. $d$ is the tongue, secured by swinging arms $e$ to the beam $a$, so as to allow a swinging movement to the tongue. The end of the plow-beam is to be fastened to the self-adjusting plate $f$ in the clevis $g$, which depends from the forward end of the beam $a$, and a clevis, $h$, through which the plow-beam passes at the rear end of the beam $a$, prevents lateral motion of the plow-beam, but allows it to move vertically. These parts are firmly held together by the braces $p$ $p$, passing from the end of the beam $a$ to clevis $g$, and from thence to the axle-tree $o$ and clevis $h$. The self-adjusting plate $f$ in the clevis $g$ has three or more holes for securing the plow-beam. The plow-beam is to be held by a bolt passed through the hole in the end of the plow-beam into one of the holes in the plate $f$, and secured by a nut on the bolt. The end of the plow-beam is held by this bolt more or less to the right or left of the line of draft, according to which hole in the plate $f$ the bolt is passed through, and by this means the width of furrow is regulated. The self-adjusting plate $f$ is hung loosely in the clevis $g$, so it may oscillate and accommodate itself to the motion of the plow.

The plow can be raised out of the ground by a foot-lever, $i$, hung upon a standard, $i'$, on the main beam $a$, and it is connected to the plow at the rear of the clevis $h$ in any suitable manner. This lever may be operated by the foot of the driver, the end of the lever being contiguous to the seat.

If the wheels of the sulky pass over roots or ditches, the plow is not thrown out of the ground, but will remain at the same depth in consequence of the vertical motion allowed to the plow-beam in the clevis $h$. A pin, $s$, at the lower end of the clevis $h$ prevents the plow-beam from dropping out of the clevis.

The depth of furrow is regulated by the hand-lever $k$, secured at one end to an eye, $t$, upon the tongue $d$, and passing loosely through an eye, $u$, on a fork, $v$, which fork $v$ is connected to the sulky-beam $a$. By the lever $k$ the driver can raise and lower the forward end of the beam $a$, and with it the clevis $g$ and plow-beam, to cause the plow to run more or less deep. I provide a projecting pin, $l$, on the lever $k$, to enter holes in the swinging plate $m$ upon the tongue $d$, for the purpose of holding the lever $k$ and beam $a$ firmly in place. This plate $m$ swings upon a fulcrum, and its lower end forms a foot-lever, which can be operated by the driver to move the plate $m$ back and forth, and release or secure the lever $k$. The double-trees are to be secured to the draft-pin $n$.

It will be seen that any ordinary plow can be readily attached to the sulky and manipulated by the driver from his seat.

I do not confine myself to the precise construction of the parts herein set forth, as they may be varied without departing from my invention.

Having thus described my invention, I claim as new and desire to secure by Letters Patent—

The lever-plate $m$, swinging and provided with foot-piece below its fulcrum, in combination with the tongue $d$ and lever $k$, having pin $l$, as and for the purpose specified.

JOHN C. WELSH.

Witnesses:
WM. H. RICE,
C. A. EMERSON.